April 3, 1951  L. F. LAWSON ET AL  2,547,272
PARKING METER

Filed Aug. 3, 1946  2 Sheets-Sheet 1

INVENTORS:
E. H. TWAROWSKI,
L. F. LAWSON.
BY O. O. Martin
ATTORNEY.

April 3, 1951 L. F. LAWSON ET AL 2,547,272
PARKING METER
Filed Aug. 3, 1946 2 Sheets-Sheet 2

INVENTORS:
E. H. TWAROWSKI,
L. F. LAWSON.
BY O D Martin
ATTORNEY.

Patented Apr. 3, 1951

2,547,272

UNITED STATES PATENT OFFICE 2,547,272

PARKING METER

Lionel F. Lawson, Los Angeles, and Eugene H. Twarowski, Hawthorne, Calif., assignors to Turret Meter Sales Company, Los Angeles, Calif., a corporation of Nevada Application August 3, 1946, Serial No. 688,360

1 Claim. (Cl. 194—61)

This invention relates to automobile parking meters such as commonly used on the streets of our cities at the present time.

It is the general object of our invention to provide a parking meter of simple and economical construction and of pleasing appearance.

The parking meters in present day use on city streets, so far as we have been able to ascertain, include graduated dials both on the side facing the roadway of the street and on the surface thereof facing the sidewalk, and they are fitted with a pointer movable along each dial to indicate the period of time for which the meter is set. The setting of the meter is accomplished by dropping a coin of a given denomination into a coin slot on the sidewalk side of the meter. Such commercially used meters are furthermore fitted with a timing mechanism and means are added for indicating on the dials warning signal of the expiration of the time for which the meter is set. This indicating means generally takes the form of a red flag which moves at the end of the parking period to cover the face of each dial.

Parking meters are ordinarily mounted on posts equidistantly placed along the edge of the sidewalks of the city streets and, as stated, with the dials on both sides thereof. Lines are marked off on the pavement of the street, or on the curbs of the sidewalks thereof, designating the limits of the spaces within which automobiles may be parked. The driver, upon parking his car, alights and steps on to the sidewalk to deposit the required coin and to set the meter before leaving the parking space. It is the duty of the police officer patrolling the street, or of some guard appointed for this purpose, periodically to examine the meters in order to ascertain whether the automobiles parked in front of the meters have remained parked beyond the period of time for which the meter is set. When it is considered that the roadway in front of meters generally is fairly filled with parked cars more or less covering the spaces in front of the meters, it is readily seen that it is a slow and laborious proposition for the officer driving along the street periodically to check up on the meters, tending to delay the traffic along the street. The inspector, on foot, is required to walk from meter to meter in order to obtain a clear view of one of the dials thereof.

In view of the foregoing it is the further object of our invention to provide a meter in which the over-parking signal is so conspicuously placed that the meter inspector may, whether driving or on foot, by merely glancing down the row of meters, either from the street side or the sidewalk side of the meters, be in a position to ascertain which meters show that the time limit has been exceeded. He may then walk or drive directly to the place where the red signal appears without having to stop in front of each parked car in order to obtain this information.

When such conspicuous signal is provided, it no longer is necessary to provide dials on both sides of the meter, but merely to retain the dial on the side thereof facing the sidewalk, the other side thereof being left entirely blank. The cost of the meter is thereby considerably reduced and the chances of such simplified meter getting out of order materially reduced. Another advantage of such single dial meter is that the driver seeking parking space is no longer able, without driving into the parking space where no red signal appears, clearly to read the dial, without alighting, in order to ascertain how much time is left on the meter and, if not sufficient for his purposes, to repeat this performance at other parking spaces along the street. Much traffic delay results from such chiseling.

Having these conditions in view, it is another object of the invention to provide a parking meter having, in addition to the superimposed over-parking signal, only one dial which is placed on the sidewalk side of the meter.

These and other objects of the invention, as well as the many advantageous features thereof, will be better understood upon perusal of the following detailed description and by referring to the accompanying drawings, of which:

Figure 1:
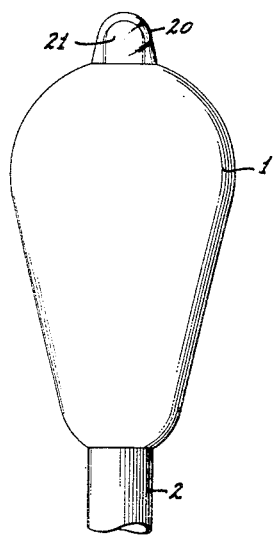
Fig. 1 is an elevational view of the side of our improved parking meter which faces the roadway of a street.
Figure 2:
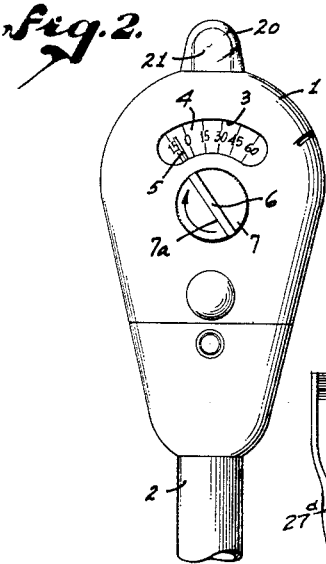
Fig. 2 shows the opposite side of the meter.
Figure 3:
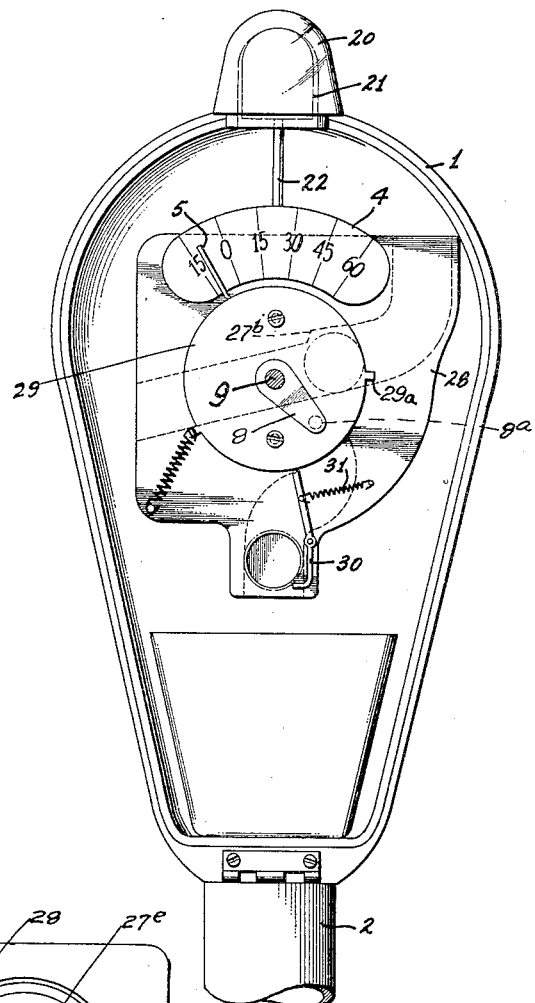
Fig. 3 is an enlarged view of the meter of Fig. 2 and with the front portion of the casing thereof removed in order to disclose the interior mechanism.

The device of the invention in the form illustrated in the drawings comprises a substantially ovoid casing 1, which is mounted on a post 2, and the latter is secured to the street surface in any suitable conventional manner. In the side of the casing facing the sidewalk is cut a crescent-shaped opening 3, through which may be seen the face of a graduated dial 4, and a pointer 5 is mounted on a pivot 6 below this dial. This pointer is set, in the manner which is hereinafter more fully described, by means of a knob 7 projecting from the dial side of the casing.

Various devices are in commercial use for effecting return movement of the pointer to zero position during the period of time for which the meter is set, of which perhaps a simple, spring actuated clock mechanism is generally preferred. Such clock mechanism may also be employed in the present device to effect rotation of the pivot 6, but as this type of mechanism is commonly used in parking meters, it is not thought necessary to burden the present description with a detailed recital thereof.

Once the pointer is set, it is found that the clock mechanism instantly commences to return the pointer to zero position. It was above stated that parking meters of the type herein considered are fitted with visible means for indicating the expiration of the time for which a meter is set and the particular type of mechanism used in the present device to operate such indicating means will now be described. A disc 10 is fastened to the pivot 6 and an arm 11 is mounted to swing on a stud 12 of this disc. The upper end of this arm is perforated to receive the pin 13 of a lever 14, which latter in turn is pivotally hung on a stud 15 of a stationary plate 16 forming part of the meter framing. The disc 10 reaches the position indicated in Fig. 4 at the time the pointer is set, and it assumes the position indicated in Fig. 5 when the pointer has returned to zero position. It is noted that, when the parts are in the position indicated in Fig. 4, the arm 11 maintains the lever 14 in a downwardly inclined position against the tension of a spring 17; also, that a pawl 18, which is hung on a pin 19 of the plate 16, engages a hook 14a of the lever to lock the latter in this downwardly inclined position.

The casing 1 is at the top thereof fitted with a transparent, dome-shaped projection 20 of a size slidably to receive therein a cylindrical plug 21 and the latter is fitted with a pendent stem 22, the lower end of which engages the outer extremity 14b of the lever 14. This plug may be made from any suitable material, and it is painted or otherwise colored to prevent a vivid-red appearance, similar to that of the flag ordinarily used in such meters.

Figure 4:
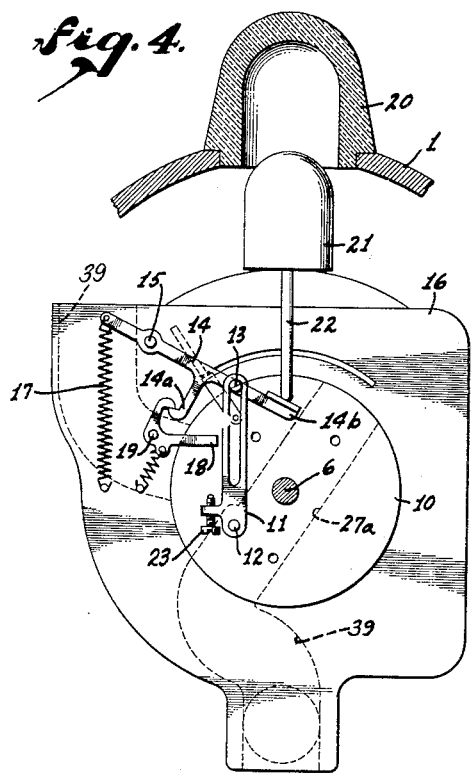
Figs. 4 and 5 illustrate the mechanism within the casing of Fig. 2, as viewed from the opposite side thereof.
Figure 5:
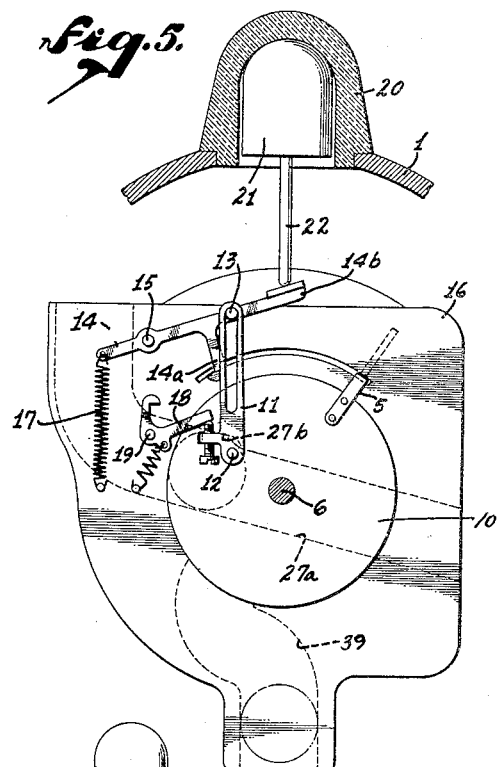

As stated, the pointer and disc instantly commence to return from the set position of Fig. 4 to zero position, and it is to be noted that the arm 11 at the same time commences to rise with the disc until, at the end of the return movement, it assumes the position indicated in Fig. 5, but it is important to note that, because of the shape of the perforation of the arm 11, the upward movement of the latter does not affect the position of the lever 14 which remains locked in position by the pawl 18 until an element 23 of the arm reaches the pawl 18 and, during the final return movement of the disc, swings this pawl out of engagement with the lever 14. The lever is now free to be swung by the spring 17 into the upper position of Fig. 5 and thereby to raise the plug 21 into the dome 20 of the casing. It is important to note that the element 23 is made adjustable thereby to insure release of the lever 14 at the proper moment.

The advantage of placing the signal in projected position above the top of the casing should be clear to anyone. By so positioning the signal it is possible for the meter inspector from any position along the street, or the sidewalk thereof, at a glance to discover the position of the meters, and he is then merely required to ascertain whether a car is parked in front of any meter showing the red signal on top thereof. It is not necessary, as in the case of the ordinary meter fitted with a flag to cover the dial thereof, to approach each meter in order to determine the position of the flag, but he has, while driving along the street as such inspectors ordinarily do, a full view of all the meter signals without having to stop and alight from the car he is driving. The shape of the dome-shaped cap 20 is also important for the reason that it serves to magnify the appearance of the signal plug and so tends to render it even more conspicuous.

Figure 6:
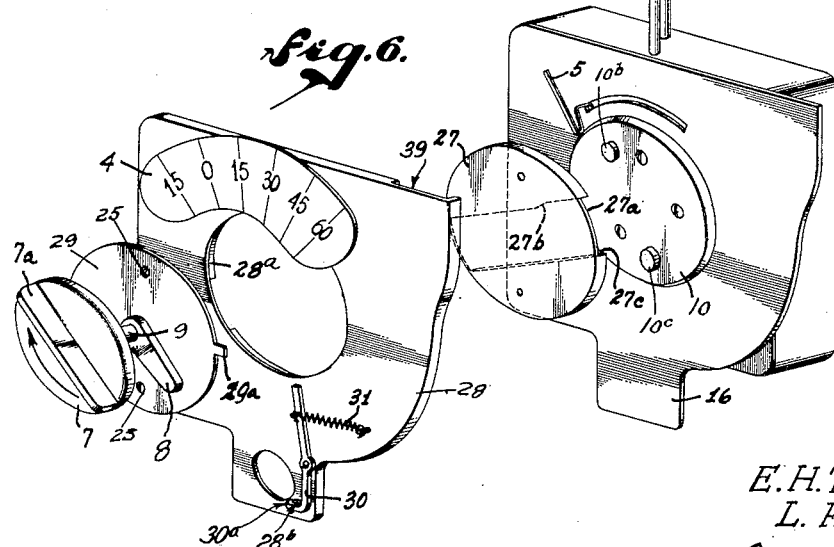
Fig. 6 is a perspective view showing the parts of the meter mechanism as they appear before they are assembled.

As above stated, parking meters are usually coin controlled, and the control mechanism of the present device operates in the following manner. The opposite side of disc 10 is shown in Fig. 6 and a circular plate 27 is placed adjacent thereto. The latter is fitted to rotate within a circular seat 28a of a frame member 28. A channel 27a is sunk into the inner face of the plate 27 and it extends diagonally across the entire surface thereof. The upper end of this channel is wide enough to receive the coin by means of which the meter is actuated, and the coin is maintained in position within the upper end of the channel against the shoulder portion 27b. The depth of this channel is slightly greater than the thickness of the coin to be deposited.

Elements 10b, 10c project from the surface of the plate 10 to lodge within sockets 27e, 27f of the circular plate 27 when the parts of Fig. 6 are pushed together to complete the assembly of the meter. It is essential that these elements register properly with the sockets in order that the disc 10 may be rotated clockwise in response to clockwise movement of the plate 27. For convenient rotation of the plate 27, we show a disc 29 mounted on the face of the plate 27, as by means of screws 25 engaging aligned, threaded perforations of the plate. The disc 29 is recessed to receive a stud 8a, of an arm 8, and the latter is rigidly secured to a stub shaft 9 in axial alignment with the pivot 6. The knob 7 is secured to the end of this stub shaft.

The parts just described are manually rotated through an arc of about 70° to bring the upper end of the recess 27a, within which the coin is lodged, into alignment with a passage 39 through which the coin is free to drop until arrested by the projecting lower end of a lever 30, and it is maintained in position by this lever while the disc completes its return movement and again is rotated to reset the pointer, at which time a lip 29a projecting from the peripheral surface of the disc 29 engages the upper end of the lever 30 to swing this lever on its pivot against the tension of a spring 31, thereby to release the coin. The latter thereupon is free to drop into a suitable receptacle at the bottom of the casing. Referring to Fig. 6 of the drawings, it is noted that a passage 28b is made through the plate 28 and that the lower end of the lever 30 is bent to pass through this passage so as to take a position in the path of movement of the coin which descends through the recess 39 of the other side of the plate, substantially as indicated at 30a.

Figure 7:
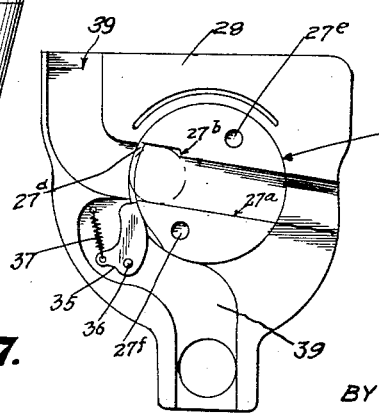
Fig. 7 is a view of the front portion of Fig. 6, as viewed from the opposite side thereof.

In order to prevent setting of the meter without depositing a coin, it is required to provide means for preventing substantial rotation of the pointer. Illustrative of simple checking means we have, in Fig. 7, shown a pawl 35 pivotally mounted at 36 within a recess of the frame member 28. A portion of the periphery of the plate 27 is cut back to provide a stop shoulder 27$^d$ which, when it is attempted to set the meter without first depositing a coin, will come to a stop against the upper end of the pawl 35 and so prevent further rotation. A spring 37 urges the pawl against the periphery of the plate. While it is true that this initial movement sets the clock mechanism of the meter to run for a few minutes, the time in this manner allowed is not found sufficient to be of any benefit to those seeking parking space.

It was above stated that the coin, when deposited, comes to a stop against the shoulder 27$^b$. When the parts are rotated to set the meter while the coin is in this position, it is found that the coin pushes the pawl 35 back, against the tension of the spring 37, and so permits continued rotation of the plate 27.

As above stated, the upper end of the recess 27$^a$ is of a size to receive the coin by means of which the meter is released for setting, and that this coin is held in position against the shoulder 27$^b$. It is now seen that if it should be attempted to operate the meter by means of a smaller coin, that such coin will roll through the entire recess and drop into the space at the bottom of the casing and so be ineffective to actuate the pointer-setting mechanism.

The two most important features of the invention should be clear from the foregoing description. By providing a registering dial only on the sidewalk side of the meter, it becomes impossible for a passing motorist to ascertain any unused time allowance in the meter without alighting and walking to the sidewalk. By placing the warning signal above the meter, it is possible from a distance to ascertain whether the time allowance has been exceeded.

We claim:

A parking meter comprising: a casing having a window in one side thereof, a dial within said casing opposite said window, a disk pivotally mounted within the casing, a pointer on said disk in front of said dial, a transparent dome at the top of said casing, a warning signal, means normally maintaining said signal in elevated position within said dome, said means including a lever engaging the lower end of said signal, resilient means biasing the lever upward to maintain the signal elevated and a link engaged at one end to said disk and connected at its other end to said lever by a lost motion connection whereby rotation of the disk in one direction to set the pointer causes the link to depress the lever, thereby to release the signal for movement out of the dome into the casing, said lost motion connection allowing limited rotation of the disk in the opposite direction without causing movement of said lever, latch members mounted in said casing engaging said lever to hold the lever in depressed position, and an abutment carried by said link and adapted to contact with said latch means to release the same when the disk has rotated through a predetermined angle in said opposite direction, thereby to allow the lever to move upward and project the warning signal into the dome.

LIONEL F. LAWSON.
EUGENE H. TWAROWSKI.

REFERENCES CITED

The following references are of record in the file of this patent:

UNITED STATES PATENTS

| Number | Name | Date |
|---|---|---|
| 629,334 | Brewer | July 25, 1899 |
| 2,177,778 | Martin | Oct. 31, 1939 |
| 2,198,422 | Woodruff | Apr. 23, 1940 |
| 2,227,182 | Finch et al. | Dec. 31, 1940 |
| 2,328,858 | Sweetland | Sept. 7, 1943 |
| 2,349,359 | MacCordy | May 23, 1944 |